United States Patent [19]

Loepfe et al.

[11] 3,916,687
[45] Nov. 4, 1975

[54] APPARATUS FOR MONITORING YARN-LIKE STRUCTURES

[75] Inventors: Erich Loepfe, Zollikerberg; René Domig, Kusnacht, both of Switzerland

[73] Assignee: Gebruder Loepfe AG, Wetzikon, Switzerland

[22] Filed: Nov. 2, 1973

[21] Appl. No.: 412,202

[30] Foreign Application Priority Data
Nov. 21, 1972  Switzerland.................... 016914/72

[52] U.S. Cl. .................. 73/160; 19/239; 28/51; 139/370 A
[51] Int. Cl.² ................... D03D 51/28; G01L 5/10
[58] Field of Search ......... 73/159, 160, 71.4, 71.54; 28/64, 51; 19/239; 139/370 A

[56] References Cited
UNITED STATES PATENTS

| | | | |
|---|---|---|---|
| 2,744,408 | 5/1956 | Seney | 73/67.2 |
| 3,183,711 | 5/1965 | Duncan | 73/160 |
| 3,273,380 | 9/1966 | Seney | 73/160 |
| 3,290,932 | 12/1966 | Hitt | 73/160 |
| 3,363,459 | 1/1968 | Brown | 73/160 |

FOREIGN PATENTS OR APPLICATIONS

| | | | |
|---|---|---|---|
| 440,073 | 12/1967 | Switzerland | 73/160 |
| 1,498,049 | 11/1965 | France | 139/370 A |

*Primary Examiner*—Richard C. Queisser
*Assistant Examiner*—Daniel M. Yasich
*Attorney, Agent, or Firm*—Werner W. Kleeman

[57] ABSTRACT

An apparatus for monitoring yarn-like structures, especially for controlling the travel of a yarn or the like at a textile machine, comprising a scanning element which can be excited to oscillate by the running yarn and a mechano-electrical transducer operatively connected therewith. The transducer only possesses a fraction of the mass of the scanning element, the transducer and the scanning element each possess a respective surface at which they are in direct oscillation-conducting contact with one another. The contact surface of the transducer amounting to only a fraction of the aforementioned surface of the scanning element, and wherein the scanning element connected with the transducer element is supported by means of an elastic mass at a rigid support.

11 Claims, 10 Drawing Figures

APPARATUS FOR MONITORING YARN-LIKE STRUCTURES

BACKGROUND OF THE INVENTION

The present invention generally relates to a new and improved construction of apparatus for monitoring filamentary material, especially yarn-like structures, in particular for the control of the travel or running of a yarn at a textile machine, embodying a scanning element which can be excited into oscillation by the running yarn and a mechano-electrical transducer element operatively connected with the scanning element.

One such type of apparatus, also referred to in the art as a yarn monitor, and possessing a plate-shaped piezoelectric transducer has been disclosed in Swiss patent 440,073. In that system there are provided on the one hand for the transducer and on the other hand for the scanning element composed of a number of parts separate elastic supports or holders. Furthermore, the essentially rod-shaped scanning element is connected via a not particularly disclosed intermediate element in oscillating-transmitting connection with the transducer. According to the disclosure of such patent the resonance frequency of the described system, which in its construction corresponds to the pick-up of a reproducing head, amounts to 5,000 Hz or more, in other words, it is in the acoustical range.

In practical operation, for instance at winding machines and looms, there oftentimes occur in the acoustical range, and also above such range, intense disturbance signals by virtue of body noise and air noise, so that faultless functioning of the yarn monitor is placed in doubt.

SUMMARY OF THE INVENTION

Hence, it is a primary object of the present invention to provide an improved construction of apparatus for monitoring yarn-like structures which is relatively simple in construction, not readily subject to breakdown and provides accurate monitoring.

Another and more specific object of the present invention relates to an improved monitoring apparatus for yarn-like structures or other filamentary structures, and which produces as large as possible disturbance ratio, that is to say, a large ratio between the useful signal emanating from the running yarn or otherwise and the disturbance signal.

In keeping with the aforementioned objective it is advantageous, through the provision of constructional measures to insure that the resonance frequency of the scanning system consisting of the scanning element and the transducer element, and which resonance frequency is to be excited by the running yarn, is considerably above the boundary of the disturbance region. Since sound absorption in air increases as a function of the square of the frequency, it is also advantageous for this reason to select the resonance frequency as high as possible for suppressing the disturbing air noise.

Now in order to implement the above objects and others which will become more readily apparent as the description proceeds, the apparatus of this development is manifested by the features that the transducer only possesses a fraction of the mass of the scanning element, that the transducer and the scanning element each possess a respective surface at which they are in direct oscillating-conducting or oscillating-transmitting contact with one another, the contact surface of the transducer only amounting to a fraction of the aforementioned surface of the scanning element. Further, the scanning element connected with the transducer is supported by means of an elastic mass at a rigid support or carrier. Advantageously, the mass of the transducer does not amount to more than 10%, preferably at most 5%, of the mass of the scanning element.

In order to be able to excite such apparatus as much as possible into resonance and to thereby obtain a useful signal with the running yarn, it is advantageous to provide for a sufficient, yet not too pronounced mechanical coupling, between the running yarn and the scanning element. This can be realized by appropriate adjustment of the wrapping angle and the yarn tension at the scanning element.

With the expressions "direct oscillation-conducting contact or direct oscillation-transmitting contact" there is to be understood that there is not provided any particular intermediate element between the scanning element and the transducer, the mass of which would appreciably influence the total mass of the system, however such contact requires a fixed acoustical coupling which generally can be produced by an intermediate layer with a high value of the acoutical impedance represented by the product $\rho \cdot c$ (density $\rho$, $c$ velocity of sound in the material), for instance a layer formed of a hardenable binder or a solder mass.

Also if desired it is permissible to use electrically insulating intermediate layers in addition to an acoustically coupling layer.

BRIEF DESCRIPTION OF THE DRAWING

The invention will be better understood and objects other than those set forth above, will become apparent when consideration is given to the following detailed description thereof. Such description makes reference to the annexed drawing wherein.

DETAILED DESCRIPTION OF THE PREFERRED EMBODIMENTS

Figure 1:
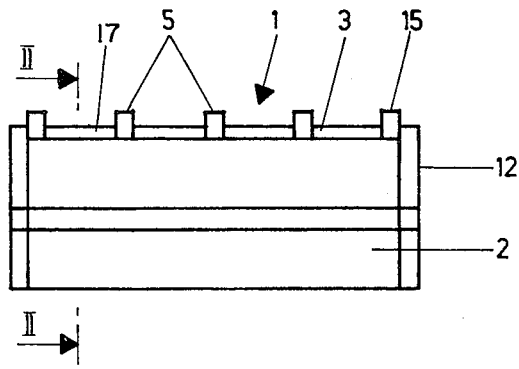
FIG. 1 schematically illustrates a scanning or sensing head for the simultaneous monitoring of a number of yarns or threads.

Describing now the drawing, the scanning or sensing inserts 3 depicted in the various figures, upon excitation by the running yarn F or the like, operate as flexural or bending oscillators and at the range above 50 kHz have at least a mechanical resonance.

Figure 2:
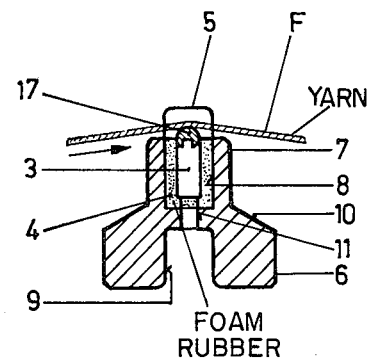
FIG. 2 is a cross-sectional view of the scanning head depicted in FIG. 1, taken substantially along the line II—II thereof.
Figure 5:
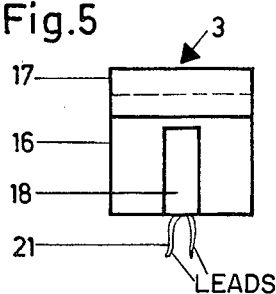
FIG. 5 is a side view of a scanning insert for the scanning head of FIGS. 1 and 2.
Figure 6:
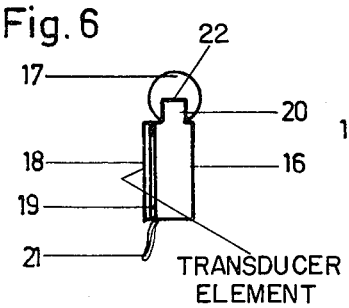
FIG. 6 is an end view of the scanning insert for the scanning head depicted in FIG. 5.

FIG. 1 illustrates a scanning or sensing head 1 with four yarn sensing locations in side view, wherein a support or carrier 2 with two end plates 12 accommodates four scanning or sensing inserts 3 which are separated by spacer elements 5, and in this regard attention is also invited to FIGS. 5 and 6. FIG. 2 illustrates a sectional view of the scanning head 1 depicted in FIG. 1, looking in the direction of and along the line II—II thereof, and which essentially possesses the shape of an inverted T. The support 2 which, for instance, is formed of light metal, encompasses a wide base or bottom piece 6 and two upwardly directed side portions or cheeks 7, which enclose therebetween an upper channel 8, this channel 8 extending in the lengthwise or longitudinal direction of the support 2. Two inclined shoulders 10 form the upper side or top surface of the bottom piece 6 which is pierced in lengthwise direction by a downwardly open lower channel 9.

Figure 3:
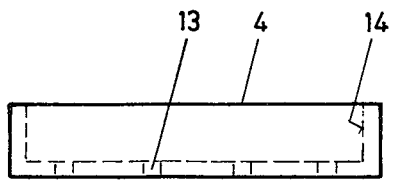
FIGS. 3 and 4 respectively illustrate details of the bearing body and spacer element components or parts of the scanning head depicted in FIGS. 1 and 2.
Figure 4:
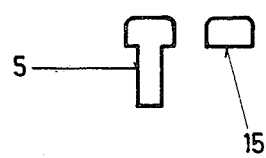

The upper channel 8 receives a bearing or support body 4 constructed as a pocket, and as best recognized by referring to FIG. 3, this bearing body 4 is formed of an elastic material defining elastic means, such as foam rubber. The inner space channel or compartment 14 of the bearing body 4 serves to house the four sensing or scanning inserts 3 and three spacer elements 5 consisting of a hard material, see FIG. 4, which separate the scanning inserts 3 from one another and fixedly position the same relative to one another. Two end or terminal spacer elements 15 are arranged at the inside of the end plates 12, as shown. The spacer elements 5 and 15 simultaneously serve to delimit the lateral movement of the yarn F infed to the individual measuring locations. Their thickness should be calculated such that they do not hinder the free oscillatory movement of the scanning inserts 3 in a direction perpendicular to the lengthwise axis of the support 2, in order not to produce any undesired dampening effects. Internally of the support 2 there are provided four bores 11 between the upper channel 8 and the lower channel 9. Through these four bores 11 there are introduced the connection terminal leads or lugs 21 of the scanning inserts 3, as best seen by referring to FIG. 5. Corresponding holes or bores 13, which coincide with the bores 11, are provided at the base or floor of the bearing body 4, and in this respect attention is especially directed to FIG. 3. The yarn F or other filamentary material being processed, as best seen by referring to FIG. 2, moves in a direction transverse to the lengthwise axis of the scanning head 1 over contact body 17.

FIGS. 5 and 6 show on an enlarged scale a scanning or sensing insert 3 in side view and end view respectively. The scanning insert possesses a base body 16 in the form of a rectangular plate, the contact body 17 and a transducer or transducer element 18 which can be a piezoelectric element of known construction which acts as a flexural or bending oscillator. The base body 16 and the contact body 17 collectively form the scanning or sensing element which is excited to oscillate by the traveling or running yarn. The components 16, 17 and 18 are rigidly connected with one another, for instance bonded or cemented with one another, so that they form a unitary oscillator, the mass and resonance behavior of which however is essentially determined by the scanning element consisting of the base body 16 and contact body 17, since the mass of the transducer 18 is relatively small in relation to the mass of the scanning element. Suitable as adhesive for the interconnection of the aforementioned components there can be advantageously used the well-known product "ARALDITE", an intermediate component adhesive formed on the basis of epoxy resin and amine hardener. The intermediate layer 19 consisting of the adhesive as shown in FIG. 6 has its thickness intentionally depicted on an exaggerated scale for the purpose of clarity in illustration. The base body 16 is provided at its upper edge with a longitudinal or lengthwise extending rib 20 which engages with a longitudinal groove 22 of the contact body 17. The base body 16 consists of metal or also of a hard non-conductive material, depending upon the dimensions and the desired resonance frequency. There can be used for instance a small brass plate of the basic dimensions 12×10×3 millimeters (including rib). The contact body 17 preferably consists of a material of larger surface hardness, such as ceramic oxide. For the purpose of electrically connecting the not particularly depicted electrodes of the transducer 18 with a non-illustrated electronic evaluation circuit there are used the connection lead or lugs 21. The width of the piezoelectric transducer 18 is not greater than one-third of the width of the base body 16, so that to both sides of the transducer there remain at the base body free strips of at least the width of the transducer. The mass of the transducer 18, with this constructional embodiment, amounts to less than 10%, preferably even no greater than 5% of the combined mass of the base body 16 and the contact body 17.

Figure 7:
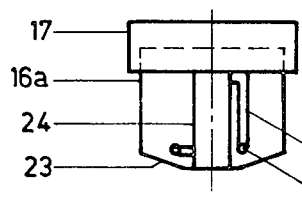
FIG. 7 is a side view of a different embodiment of scanning insert.
Figure 8:
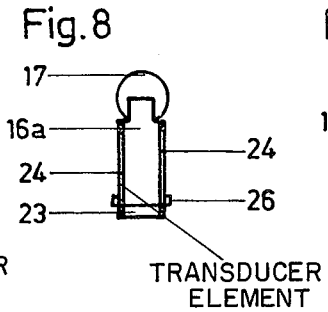
FIG. 8 is an end view of the variant embodiment depicted in FIG. 7.

FIGS. 7 and 8 depict a scanning or sensing insert, the base body 16a of which possesses a rectangular basic form having lower bevelled or inclined edges 23 and is composed of non-conducting material, such as ceramic oxide. Both sides of the base body 16a are coated or covered along its broken depicted symmetry line with a respective narrow semiconductor-strain gauge strip 24, which is directly applied to the insulating base body 16a. This construction has the advantage that it is possible to extensively freely select the form of the transducers 24, in order to only cover such parts of the front surface of the base body which at resonance have large in-phase oscillation amplitudes and to thus deliver a large useful signal. The bevelled portions 23 of the base body 16a serve to suppress undesired oscillation modes, that is to say, to realize a sharper resonance for a predetermined oscillation mode. Since the mass of the strain gauge strips 24 can be maintained very small, with this exemplary embodiment, the resonance behavior of the scanning insert is determined practically only by the base body 16a and the contact body 17. For the purpose of electrically connecting the transducers 24 there are provided the conductor tracks 25 applied to the base body 16a and the connection terminals or leads 26. The contact body 17, in this case extends at both of its ends in the form of a small piece past the base body 16a, as best seen by referring to FIG. 7.

Figure 9:
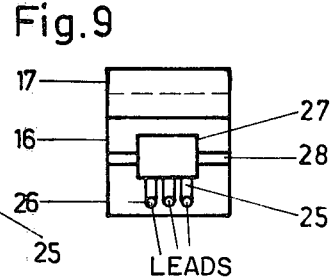
FIG. 9 is a side view of a further embodiment of scanning insert.
Figure 10:
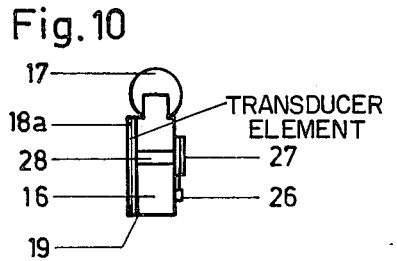
FIG. 10 is an end view of the embodiment depicted in FIG. 9.

The scanning or sensing insert of the embodiment depicted in FIGS. 9 and 10 is constructed the same as the embodiment of scanning insert depicted in FIGS. 5 and 6 as concerns the base body 16, the contact body 17 and the arrangement of the transducer 18a. The transducer in this case is constructed as an electret film with two electrodes at the large surface of the film. Electret films suitable for the purposes of the invention are readily available on the market and are used, for instance, in capacitor microphones for generating a prebias. Additionally, in this case there is arranged at the surface of the base body 16 which faces away from the transducer 18a a flat electronic component 27, which is connected with both of the electrodes of the transducer element through the agency of two connection lines or conductors 28 arranged at the base body 16 and insulated with respect thereto. The electronic component 27 can encompass for instance a field-effect transistor and other electronic components, for instance a coupling capacitor, a resistor and a diode for rectification of the output signal of the field-effect transistor, and is preferably designed as an integrated component. For the connection with an evaluation circuit arranged externally of the scanning insert there are provided at the base body 16 conductor tracks or lines 25 and the connection terminals or leads 26.

It should be readily understood that for the scanning or sensing inserts depicted in FIGS. 5 to 10 there can be employed flat transducers of the random type; thus instead of a piezoelectric transducer there can be employed a strain gauge strip or an electret transducer.

While there is shown and described present preferred embodiments of the invention, it is to be distinctly understood that the invention is not limited thereto, but may be otherwise variously embodied and practiced within the scope of the following claims.

What is claimed is:

1. A scanning head for monitoring the travel of yarn-like structures, especially for controlling the travel of a running yarn at a textile machine, comprising rigid support means, at least one scanning insert means arranged for oscillation in a resonant mode when in contact with and excited by the traveling yarn, elastic means arranged between the rigid support means and said at least one scanning insert means, said rigid support means comprising a substantially elongate support provided with a channel having walls, said channel receiving said at least one scanning insert means and having two end plates for closing the ends of said channel, said scanning insert means comprising a scanning element having a substantially plate-shaped base body having substantially flat surfaces arranged in parallel relationship to said walls, a plate-shaped transducer having substantially flat surfaces and output means for transmitting the output of the transducer, said transducer and said base body being fixedly connected with one another at one of their plane surfaces in direct oscillation conducting manner, said scanning insert means further comprising an elongated contact body extending along and fixedly connected with one edge of the base body and exposed to the yarn traveling in a direction substantially perpendicular to said elongated contact body, said elastic means being arranged adjacent the walls of said channel and contacting the base body at said flat surfaces thereof.

2. The scanning head as defined in claim 1, wherein said transducer possesses a substantially elongate rectangular construction and is arranged at the base body along a central line of the base body which extends substantially perpendicular to the contact body in such a manner that to both sides of the transducer there remain at the base body free strips of at least the width of the transducer.

3. A scanning head as defined in claim 2, constructed for receiving a multiplicity of scanning inserts, wherein said elastic means comprises an elongate extending pocket-shaped bearing body of soft elastic material arranged in said channel, a number of said scanning inserts located in the bearing body in its lengthwise direction and arranged adjacent one another in spaced relationship, and spacer elements arranged between said scanning inserts.

4. The scanning head as defined in claim 1, wherein the contact body is of substantially rod-shaped configuration and provided with a longitudinal groove, and the plate-shaped base body is provided at one edge thereof with a rib which engages with said longitudinal groove and is fixedly connected therein with the contact body.

5. The scanning head as defined in claim 1, wherein the mass of the transducer does not exceed 10% of the mass of its respective insert.

6. The scanning head as defined in claim 1, wherein the mass of the transducer does not exceed 5% of the mass of its respective scanning insert.

7. The scanning head as defined in claim 1, wherein said transducer comprises at least one piezoelectric transducer.

8. The scanning head as defined in claim 1, wherein said transducer comprises at least one strain gauge strip.

9. The scanning head as defined in claim 8, wherein said at least one strain gauge strip comprises a semiconductor-strain gauge strip.

10. The scanning head as defined in claim 1, wherein said transducer comprises an electret transducer.

11. A scanning head for monitoring the travel and continuity of yarn-like structures, especially for controlling the travel of a running yarn at a textile machine comprising:

a rigid support including a substantially elongate support having provided therein a channel having walls;

at least one scanning insert means for oscillating in a resonant mode when contacted with and excited by the running yarn, said insert means disposed in sid channel and comprising a substantially plate-shaped base body having substantially flat surfaces arranged substantially parallel to said walls, said base body having a free edge provided with a rib, an elongated contact body adapted to be exposed to the running yarn in a direction substantially perpendicular thereto, said contact body having a longitudinal groove engaging and fixedly connected with the rib of said base body, and a plate-shaped mechano-electric transducer element having at least one plane surface and a substantially elongate rectangular construction, said transducer element being fixedly connected at said plane surface to a flat surface of said base body along a central line thereof extending substantially perpendicular to the contact body, said transducer element being connected to said base body in such manner that a free area having a width at least the width of the transducer element is provided at the base body on both sides of the transducer element, the mass of said transducer element not exceeding 10% of the combined mass of the base body and the contact body; and elastic means being arranged adjacent the walls of said channel between said walls and said base body, said elastic means contacting the base body at the flat surfaces thereof.

* * * * *